United States Patent
Ollila (10) Patent No.: US 11,967,117 B2
(45) Date of Patent: Apr. 23, 2024

(54) CLOUD-BASED TRAINING AND CAMERA CORRECTION

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 170 days.

(21) Appl. No.: 17/701,172

(22) Filed: Mar. 22, 2022

(65) Prior Publication Data
US 2023/0316577 A1    Oct. 5, 2023

(51) Int. Cl.
*G06T 7/00*    (2017.01)
*G06N 3/082*    (2023.01)
*G06T 7/73*    (2017.01)
*G06T 7/80*    (2017.01)

(52) U.S. Cl.
CPC ............... *G06T 7/97* (2017.01); *G06N 3/082* (2013.01); *G06T 7/80* (2017.01); *G06T 7/74* (2017.01); *G06T 2207/10148* (2013.01); *G06T 2207/20081* (2013.01); *G06T 2207/30244* (2013.01)

(58) Field of Classification Search
CPC ... G06T 7/97; G06T 7/80; G06T 2207/30244; G06T 2207/10148; G06T 2207/20081; G06T 7/74; G06N 3/082
See application file for complete search history.

(56) References Cited

U.S. PATENT DOCUMENTS

| 2014/0074479 | A1* | 3/2014 | Kassam | G10L 25/48 704/270 |
| 2015/0062170 | A1* | 3/2015 | Kim | H04N 9/3147 345/634 |
| 2019/0110077 | A1* | 4/2019 | Kim | H04N 1/00167 |
| 2020/0309541 | A1* | 10/2020 | Lavy | G06V 20/588 |
| 2022/0174261 | A1* | 6/2022 | Hornstein | G06T 7/33 |

OTHER PUBLICATIONS

Yao et al., "Research of Camera Calibration Based on Genetic Algorithm BP Neural Network",2016,IEEE (Year: 2016).*
Yuan et al., "A New Camera Calibration Based on Neural Network with Tunable Activation Function in Intelligent Space", 2013, IEEE (Year: 2013).*

* cited by examiner

*Primary Examiner* — Yujang Tswei
(74) *Attorney, Agent, or Firm* — Ziegler IP Law Group (57) ABSTRACT

A method implemented by a server communicably coupled to at least two devices, each device including camera(s), the devices being present within same real-world environment. The method includes: receiving, from the devices(s), images captured by respective cameras of the devices; identifying one of the devices whose camera has camera parameter(s) better than camera parameter(s) of camera of another of the devices; training neural network using images captured by camera of one of the devices as ground truth material and using images captured by camera of another of the devices as training material; generating correction information to correct images captured by camera of another of the devices using trained neural network; and correcting the images captured by the camera of the another of the device(s) by utilising the correction information at the server, or sending correction information to another of the devices for correcting the images.

28 Claims, 4 Drawing Sheets

CLOUD-BASED TRAINING AND CAMERA CORRECTION

TECHNICAL FIELD

The present disclosure relates to methods for implementing cloud-based training and camera corrections. The present disclosure also relates to systems for implementing cloud-based training and camera corrections.

BACKGROUND

In present times, various types of cameras and devices employing cameras are being developed and used in a wide variety of applications. These cameras have different costs and produce images of different image qualities. Over time, camera accuracy, drift and quality also varies. Nowadays, multi-camera systems are increasingly being used. Cameras and multi-camera systems often have different kinds of physical components. In particular, their sensors and sensors' colour microlens arrays may be different (for example, one camera in a given multi-camera system may be an infrared camera, while another camera in the given multi-camera system may be a Red-Green-Blue (RGB) camera or a mono camera; one camera in a given multi-camera system may employ a Bayer colour filter, while another camera in the given multi-camera system may employ a non-Bayer colour filter, and the like); optics characteristics (such as f-number, focal length, focus distance, depth of focus, and the like) may be different; Image Signal Processor (ISP) may be different (for example, ISPs of different cameras may have completely different processing pipelines, manufacturers, and the like), and so forth. As an example, such multi-camera systems are widely employed in the fields of computer vision, panoramic photography, robot navigation, extended reality, and the like. When multiple cameras are used in a same real-world environment, they are required to be well-calibrated with respect to said environment, as well as each other.

Typically, camera calibration for a given camera is performed by controlling the given camera to capture an image of a test chart, correcting the captured image to match the test chart (in terms of exposure evenness, geometry errors, colour correction, smears, and the like) for obtaining correction coefficients, and using the correction coefficients for correcting images captured by the given camera. However, this approach is not very effective in situations where multiple cameras are used in the same real-world environment. In such situations, a difference in image quality that is obtained upon calibration of high-quality cameras and low-quality cameras is quite high, which is undesirable. When visual experiences are generated using images captured by both these different types of cameras, the visual experiences are visually inconsistent and thus appear unrealistic.

Therefore, in light of the foregoing discussion, there exists a need to overcome the aforementioned drawbacks associated with camera calibration in multi-camera systems.

SUMMARY

The present disclosure seeks to provide a method for implementing cloud-based training and camera correction. The present disclosure also seeks to provide a system for implementing cloud-based training and camera correction. An aim of the present disclosure is to provide a solution that overcomes at least partially the problems encountered in prior art.

In one aspect, an embodiment of the present disclosure provides a method implemented by a server that is communicably coupled to at least two devices, each device comprising at least one camera, the at least two devices being present within a same real-world environment, the method comprising:
  receiving, from the at least two devices, images captured by respective cameras of the at least two devices;
  identifying one of the at least two devices whose camera has at least one camera parameter that is better than at least one camera parameter of a camera of another of the at least two devices;
  training a neural network using images captured by the camera of the one of the at least two devices as ground truth material and using images captured by the camera of the another of the at least two devices as training material;
  generating correction information that is to be utilised to correct images captured by the camera of the another of the at least two devices using the trained neural network; and
  correcting the images captured by the camera of the another of the at least two devices by utilising the correction information at the server, or sending the correction information to the another of the at least two devices for correcting the images captured by the camera at the another of the at least two devices.

In another aspect, an embodiment of the present disclosure provides a system comprising a server that is communicably coupled to at least two devices, each device comprising at least one camera, the at least two devices being present within a same real-world environment, wherein the server is configured to:
  receive, from the at least two devices, images captured by respective cameras of the at least two devices;
  identify one of the at least two devices whose camera has at least one camera parameter that is better than at least one camera parameter of a camera of another of the at least two devices;
  train a neural network using images captured by the camera of the one of the at least two devices as ground truth material and using images captured by the camera of the another of the at least two devices as training material;
  generate correction information that is to be utilised to correct images captured by the camera of the another of the at least two devices using the trained neural network; and
  correct the images captured by the camera of the another of the at least two devices by utilising the correction information at the server, or send the correction information to the another of the at least two devices for correcting the images captured by the camera at the another of the at least two devices.

Embodiments of the present disclosure substantially eliminate or at least partially address the aforementioned problems in the prior art, and enable accurate, reliable cloud-based training of neural networks and camera corrections based on such training to improve image quality of cameras based on data obtained from other cameras in the same real-world environment.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method implemented by a server that is communicably coupled to at least two devices, each device comprising at least one camera, the at least two devices being present within a same real-world environment, the method comprising:
receiving, from the at least two devices, images captured by respective cameras of the at least two devices;
identifying one of the at least two devices whose camera has at least one camera parameter that is better than at least one camera parameter of a camera of another of the at least two devices;
training a neural network using images captured by the camera of the one of the at least two devices as ground truth material and using images captured by the camera of the another of the at least two devices as training material;
generating correction information that is to be utilised to correct images captured by the camera of the another of the at least two devices using the trained neural network; and
correcting the images captured by the camera of the another of the at least two devices by utilising the correction information at the server, or sending the correction information to the another of the at least two devices for correcting the images captured by the camera at the another of the at least two devices.

In another aspect, an embodiment of the present disclosure provides a system comprising a server that is communicably coupled to at least two devices, each device comprising at least one camera, the at least two devices being present within a same real-world environment, wherein the server is configured to:
receive, from the at least two devices, images captured by respective cameras of the at least two devices;
identify one of the at least two devices whose camera has at least one camera parameter that is better than at least one camera parameter of a camera of another of the at least two devices;
train a neural network using images captured by the camera of the one of the at least two devices as ground truth material and using images captured by the camera of the another of the at least two devices as training material;
generate correction information that is to be utilised to correct images captured by the camera of the another of the at least two devices using the trained neural network; and
correct the images captured by the camera of the another of the at least two devices by utilising the correction information at the server, or send the correction information to the another of the at least two devices for correcting the images captured by the camera at the another of the at least two devices.

The present disclosure provides the aforementioned method and the aforementioned system. The images captured by both a high-quality camera (i.e., the camera having relatively better camera parameter(s)) and a low-quality camera (i.e., the camera having relatively worse camera parameter(s)) present in the same real-world environment are used to train the neural network, so that the trained neural network generates accurate correction information for improvement in quality of images captured by the low-quality camera. In other words, a given camera that is less well performing (i.e., has low image quality) is calibrated/corrected using data acquired from other camera(s) that is/are more well performing (i.e., have higher image quality). Such data can be easily maintained and utilised at cloud-based servers, for cloud-based training of the neural network. As the neural network is trained over a period of time, the correction information so generated is highly accurate and useful, thereby leading to considerable improvement in image quality of the images captured by the low-quality camera. Additionally, the correction information also cancels or minimises drift of camera parameters over this period of time. Moreover, the method can be utilized to train neural networks that calibrate/correct cameras for use cases that are not thought when such cameras are designed and manufactured. This advantageously enables effective use of such cameras for newer use cases as required, so that such cameras can be used for a wide variety of applications. The system can be communicably coupled to devices employing various types of cameras or camera systems and can be beneficially utilized for calibration/correction of different types of cameras or camera systems.

It will be appreciated that the correction information is not only employed to correct subsequent images captured by the camera at the another of the at least two devices, but could also be employed to correct previous images captured by said camera (namely, the previous images captured by said camera prior to generation of the correction information). In such a case, the previous images may have been stored by the server. In this way, the aforementioned method and the aforementioned system could be usefully employed in a use case scenario where a low-quality camera has been in use in a real-world environment from a long time period (for example, a few days, a few weeks, a few months, or the like), and where a high-quality camera has been recently found to be in use in the same real-world environment.

The server controls an overall operation of the system. The server is communicably coupled to the at least two devices wirelessly and/or in a wired manner, via at least one communication network. The server could be implemented as a processor of a computing device (such as a laptop computer, a desktop computer, a workstation, or similar), or as a cloud-based server, or similar. In an exemplary practical implementation of the system, the server can be connected to the at least two devices using an ad hoc network.

Optionally, the system further comprises a data repository communicably coupled to the server. Optionally, the server is configured to store at least the correction information at the data repository. Optionally, the server is configured to also store (received) images captured by a camera of a given device at the data repository. In some instances, for example when the received images are not sufficient in number or do not have sufficient variety of visual content to train the neural network, such images may continue to be stored at the data repository until more images are received from another camera to constitute sufficient variety of visual content for training the neural network successfully. Herein, the term "data repository" refers to hardware, software, firmware, or a combination of these for storing a given information in an organized (namely, structured) manner, thereby, allowing for easy storage, access (namely, retrieval), updating and analysis of the given information. It will be appreciated that the data repository could be implemented as a cloud-based memory, a memory of a computing device, a local memory of the another of the at least two devices, an external memory of the another of the at least two devices, or similar.

Throughout the disclosure, the term "device" refers to an equipment that comprises one or more cameras. Each of the at least two devices comprise the at least one camera. Examples of a given device include, but are not limited to, a head-mounted display (HMD), a teleport node, and the like. The HMD is a specialized equipment that is configured to present an extended-reality (XR) environment to the user when the HMD in operation is worn by the user on his/her head. In such an instance, the HMD acts as a device (for example, such as an XR headset, a pair of XR glasses, and the like) that is operable to present a visual scene of the XR environment to the user. The term "extended-reality" encompasses virtual reality (VR), augmented reality (AR), mixed reality (MR), and the like. The teleport node is a device which facilitates virtual teleportation between said device and one or more other devices.

Optionally, the at least one camera is implemented as at least one of: a visible-light camera, a depth camera. Examples of the visible-light camera include, but are not limited to, a Red-Green-Blue (RGB) camera, a monochrome camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. It will be appreciated that a given camera could be implemented as a combination of the visible-light camera and the depth camera.

Notably, the at least two devices are present within the same real-world environment, and this makes a comparison of the at least one camera parameters of their respective cameras feasible. In some implementations, a field of view of the respective cameras of the at least two devices is same, whereas in other implementations, a field of view of the respective cameras of the at least two devices is different. Throughout the present disclosure, the term "field of view" of a given camera refers to an observable extent of the real-world environment that is captured by the given camera. The field of view of the given camera is expressed in terms of degrees or radians. The field of view of the given camera may depend on a size of an image sensor of the given camera.

It will be appreciated that the steps of the method could be performed each time the at least two devices are present within the same real-world environment. In such a case, the trained neural network could be further trained based on new images captured by the respective cameras of the at least two devices. Moreover, the new images may be captured seconds, minutes, hours, days, weeks, or similar, after capturing of images used to train the neural network previously. Optionally, the server is configured to detect when the at least two devices are present within the same real-world environment. The server is configured to perform the aforesaid steps when it is detected that the at least two devices are present within the same real-world environment. Optionally, in this regard, the server is configured to:

receive, from the at least two devices, depth information indicative of: surfaces present in the same real-world environment of the at least two devices, optical depths of points on the surfaces with respect to the at least two devices; and detect that the at least two devices are present within the same real-world environment, when respective depth information received from the at least two devices matches at least partially.

The depth information is generated by the at least two devices using an active illuminator and an active sensor of the at least two devices. As an example, the active illuminator may be implemented as an infrared (IR) illuminator (such as an array of IR LEDs) while the active sensor may be implemented as an IR sensor (such as an IR camera).

Optionally, the at least two devices have an overlap of at least a predefined angular width in the fields of view of their respective cameras.

Notably, an extent of the overlap could be expressed in terms of degrees, radians, a percentage of a field of view of a given camera. As an example, the fields of view may have a 50 percent overlap. Optionally, the predefined angular width lies in a range of 5-60 degrees. For example, the predefined angular width may be from 5, 7.5, 10, 15, 25 or 50 degrees up to 10, 25, 40 or 60 degrees. The technical advantage of the overlap is that a common region of the same real-world environment corresponding to this overlap will be represented in the images captured by the respective cameras of each of the at least two devices. This not only allows for easily and accurately identifying the one of the at least two devices whose camera has better camera parameter(s), based on a comparison between the images representing the common region, but also allows for accurately training the neural network.

The server receives the images captured by the respective cameras of the at least two devices, the images being at least one of: visible-light images, depth images, phase images, amplitude frames. A given visible-light image represents visual content of the real-world environment, which encompasses not only colour information represented in the image, but also other attributes associated with the image (for example, such as luminance information, transparency information, and the like). A given depth image is indicative of optical depths of various regions of the real-world environment from a given camera which captured the depth image. A given phase image is representative of a phase shift between a modulated light signal used to illuminate the real-world environment and a reflection of the modulated light signal. A given amplitude frame comprises an array of pixels, each pixel having an amplitude energy value. Optionally, the images are received in real-time or near-real time as they are captured by the respective cameras of the at least two devices.

Optionally, the images are received in a raw image format. Notably, the raw image format is used as it contains minimally processed data from image sensors of the respective cameras of the at least two devices. Moreover, the images in the raw image format are not encoded, and thus, there are no unwanted changes in the image quality due to encoding. It will be appreciated that any changes in the original image quality arising due to encoding can negatively affect the performance of the system and the method. In other words, comparing the images received in the raw image format allows to determine actual differences between the images, and therefore, allows for a more accurate comparison of the at least one camera parameter of the respective cameras of the at least two devices.

Alternatively, optionally, the images are received as phase images. Moreover, the phase images can be captured at different frequencies. Typically, a phase image is captured using a depth camera (for example, such as a ToF camera) by: illuminating the real-world environment with a modulated light signal, and then detecting and processing a reflection of the modulated light signal that is received from the real-world environment, for determining a specific phase shift between said illumination and said reflection. The "phase image" is representative of such a phase shift and multiple phase images can be used to generate a depth image. The phase image is collected by sampling a cross correlation of the emitted modulated light signal with the reflected modulated light signal.

In some implementations, the images captured by the camera of the one of the at least two devices and the images captured by the camera of the another of the at least two devices are captured simultaneously. Typically, real-world environments are dynamic in nature and often include dynamic objects (i.e., objects whose state (such as shape, position, orientation, and the like) are susceptible to change) as well as static objects. Therefore, the images captured by the camera of the one of the at least two devices and the images captured by the camera of the another of the at least two devices are captured simultaneously to avoid any issues arising from a change in lighting, object's state, and the like, that may occur when imaging such dynamic real-world environments. Moreover, when the images are captured simultaneously, it is easier to compare them for determining their image quality, wherein their image quality is indicative of camera parameters of the respective cameras. Optionally, the server is configured to pre-process the images captured by the respective cameras of the at least two devices to detect whether or not motion of a moving object is represented in any image, and when it is detected that the motion of the moving object is represented in any image, discard said image.

In other implementations, the images captured by the camera of the one of the at least two devices and the images captured by the camera of the another of the at least two devices are captured at different times. A time difference between these different times may be a few hours (for example, such as 1 hour, 12 hours, 24 hours, 36 hours, and the like), a few days (for example, such as 1 day, 2 days, 5 days, 10 days, and the like), a few weeks (for example, such as 1 week, 2 weeks, 10 weeks, 26 weeks, and the like), a few months (for example, such as 1 month, 3 months, 6 months, and the like), a few years (for example, such as 1 year, 1.5 years, 2 years, and the like), and similar.

Optionally, the images captured by the respective cameras of the at least two devices are processed to identify the one of the at least two devices whose camera has at least one camera parameter that is better than at least one camera parameter of a camera of another of the at least two devices. Such processing of the images may also be referred to as "image analysis". Herein, the processing of the images may be performed by analysing at least one of: features, feature geometry, colours, contrast, sharpness, depth. Image processing techniques and algorithms for performing such analysis are well-known in the art. Notably, a given camera is determined to have at least one camera parameter that is better than at least one camera parameter of another camera when a first image captured by the given camera has a higher image quality as compared to a second image captured by the another camera. Herein, the first image is determined to have the higher image quality as compared to the second image when the first image has at least one of: more realism, better look, better sharpness, better contrast, better colour reproduction, larger range of optical depths, as compared to the second image. It will be appreciated that image quality of a given image is dependent on camera parameter(s) of a camera that captured the given image. Optionally, the at least one camera parameter is at least one of: a range of optical depths, a range of colours, an accuracy of autofocus (AF), a speed of AF, a scaling factor, a shutter speed, a lens aperture, a sensitivity, a pixel intensity, a pixel size, an amount of shading, a colour saturation, a hue, a white balance, an accuracy of colour reproduction, a denoising factor, a lens distortion.

As an example, a first device implemented as the HMD and a second device implemented as the teleport node are present within the same real-world environment. The first device may comprise a flagship camera whereas the second device may comprise a consumer-level budget camera. In such a case, the images captured by the respective cameras may be analysed to identify that the flagship camera of the first device has better camera parameter(s) than the consumer-level budget camera of the second device.

Optionally, the step of identifying the one of the at least two devices is performed based on historical data of the camera of the one of the at least two devices and the camera of the another of the at least two devices, wherein the historical data pertains to at least one image analysis of images captured previously. The at least one image analysis is performed on the images captured previously by the respective cameras of the at least two devices. The historical data is indicative of a historical comparison of image quality of the cameras of the at least two devices. This historical comparison may be based on historical data values (such as colour values, sharpness values, contrast values, ranges of optical depths, and the like) obtained upon the at least one image analysis of the images captured previously. The historical data beneficially indicates that image quality of images captured by the camera of the one of the at least two devices is higher than image quality of images captured by the camera of the another of the at least two devices. It will be appreciated that the historical comparison of image quality that is indicated by the historical data is likely to be true even in future and thus the historical data may be beneficially used as a factor to identify the one of the at least two devices (i.e., the device having better camera(s)). Optionally, the historical data is stored at the data repository. Optionally, when more than two devices are communicably coupled to the server, historical data of at least one camera of the more than two devices is employed to: detect at least one pair of cameras whose images are to be utilized for training the neural network, or detect at least one pre-trained neural network.

Optionally, the neural network is trained by employing at least one artificial intelligence algorithm. Such training is performed using the images captured by the respective cameras of the at least two devices. The neural network could be trained fully or partially, using the method. In case of full training, the neural network is an untrained neural network prior to said training. In case of partial training, the neural network is a partially pre-trained neural network prior to said training. Examples of the neural network include, but are not limited to, a Convolutional Neural Network (CNN), a generative adversarial network (GAN), a Recurrent neural network (RNN), and an autoencoder. The GANs typically work with image data and use Convolutional Neural Networks (CNNs) as generator and discriminator models. The generator and discriminator usually have deep convolutional layers to avoid difficulty in scaling of neural networks and to increase their capabilities by making them deeper. Operation of an exemplary neural network is elucidated in conjunction with FIG. 3. In an example, the neural network is implemented as a Deep Convolutional Generative Adversarial Network (DCGAN). Other well-known examples of the GANs are Bicycle GAN and CycleGAN. The GANs are widely used nowadays for various deep learning-based applications (for example, such as to synthesize new images from existing images). Other examples of the neural network are convolutional autoencoders and variational autoencoders that can be used for manipulating (modifying) images as well as synthesize new images that are based on the content and style of at least two different images. These autoencoders include an encoder part and a decoder part. Moreover, the neural network could be a partially pre-trained neural network for the at least two devices, which is further trained using the steps of the method. In such a case, a lesser number of images captured by the respective cameras of the at least two devices may be required for training as compared to when the neural network is not pre-trained for the at least two devices. Moreover, in such a case, very high-quality results (for example, very accurate correction information) may be obtained upon further training the pre-trained neural network. The neural network may be trained by the server in cloud and may be a cloud-based neural network. The images captured by the one of the at least two devices have better image quality and are therefore used as ground truth material. The images captured by the camera of the another of the at least two devices have relatively lower image quality and are therefore used as training material. Herein, "ground truth material" refers to an ideal expected result. Such result is better as compared to the training material but may not be perfect. When the neural network is trained using the ground truth material and the training material, the neural network infers a function indicative of a difference between the ground truth material and the training material. This function is subsequently utilised by the trained neural network to generate the correction information. Additionally, optionally, the neural network is recompiled and transferred to the another of the at least two devices. A deep learning framework such as a TensorFlow framework, a PyTorch framework, a Keras framework, a Caffe framework, or similar may be applied for training the neural network.

In an embodiment, the method further comprises:
receiving, from the at least two devices, pose information indicative of poses of the respective cameras of the at least two devices; and
determining, based on the pose information, a relative position and orientation between the respective cameras of the at least two devices, wherein the neural network is trained based on the relative position and orientation between the respective cameras.

In this regard, along with the images captured by the respective cameras of the at least two devices, the server further receives the pose information. Herein, the term "pose" encompasses both position and orientation. Optionally, the server is configured to employ at least one formula pertaining to coordinate geometry, to determine the relative position and orientation between the respective cameras of the at least two devices. A 3D space of the same real-world environment in which the at least two devices (and their respective cameras) are present can be represented by a coordinate system. The coordinate system defines positions within the 3D space of the same real-world environment. Optionally, the coordinate system has a predefined origin and three mutually perpendicular coordinate axes. The three mutually perpendicular coordinate axes could be, for example, X, Y, and Z axes. Optionally, in this regard, the position in the coordinate system is expressed as (x, y, z) position coordinates along the X, Y and Z axes, respectively. Herein, the at least one formula pertaining to coordinate geometry determines a relative position and orientation between position coordinates of the respective cameras of the at least two devices. A technical effect of using the relative position and orientation between the respective cameras to train the neural network is that it enables the neural network to infer a relative position and orientation-based relationship between the ground truth material and the training material. Such a relationship is indicative of how the relative position and orientation between the respective cameras affects certain camera parameters as well as image quality of the images captured by the respective cameras. Moreover, training the neural network, based on the relative position and orientation between the respective cameras, enables the neural network to also be used for other use cases besides generation of the correction information.

In some implementations, the respective cameras of the at least two devices capture similar scenes of the real-world environment. For example, one camera may capture a front view of a fountain in a garden while the other camera may capture a slightly-offset front view of the fountain. In other words, the captured images represent a nearly similar view of the fountain. In other implementations, the respective cameras of the at least two devices capture different scenes of the real-world environment. In such other implementations, one image could be used for view extrapolation (i.e., reprojection) to match a view represented in the other image. Upon such view extrapolation, these images can be compared easily and can be utilised effectively for training of the neural network. For example, one camera may capture a front view of a fountain in a garden, while the other camera may capture a right perspective view of the fountain. An image representing the front view may be used for view extrapolation to match another image representing the right perspective view.

Optionally, each of the at least two devices further comprises a pose-tracking means that, in operation, collects pose-tracking data, wherein the pose-tracking data is utilized to generate the pose information. In some implementations, the pose-tracking data serves as the pose information, whereas in other implementations, the pose-tracking data is processed, by respective processors of the at least two devices, to obtain the pose information. Optionally, a given processor employs at least one data processing algorithm to process the pose-tracking data for obtaining the pose information. The at least one data processing algorithm depends on a type of the pose-tracking data.

The term "pose-tracking means" refers to a specialized equipment that is employed to detect and/or follow poses of a given camera of a given device in a 3D space of the real-world environment. Pursuant to embodiments of the present disclosure, the pose-tracking means is implemented as a true six Degrees of Freedom (6DoF) tracking system.

In other words, the pose-tracking means performs pose tracking within the 3D space of the real-world environment. In particular, said pose-tracking means is configured to track translational movements (namely, surge, heave and sway movements) and rotational movements (namely, roll, pitch and yaw movements) of the given camera of the given device within the 3D space.

A given pose-tracking means could be implemented as an internal component of the given device, as a tracking system external to the given device, or as a combination thereof. The given pose-tracking means could be implemented as at least one of: an optics-based tracking system (which utilizes, for example, infrared (IR) beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. As an example, a detectable object may be an active IR Light-Emitting Diode (LED), a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible-light camera, an RFID reader. Optionally, the given pose-tracking means is implemented as a given processor that is configured to determine a given pose of the given camera using a Simultaneous Localization and Mapping (SLAM) technique.

In another embodiment, the method further comprises processing the images captured by the respective cameras of the at least two devices for determining a relative position and orientation between the respective cameras of the at least two devices, wherein the neural network is trained based on the relative position and orientation between the respective cameras. Optionally, in this regard, the step of processing the images captured by the respective cameras of the at least two devices is performed using at least one computer vision technique. In such processing, features in the images are matched with each other, then such matching is utilized to determine the relative pose between the respective cameras (and, optionally, absolute poses of the respective cameras too). Examples of the at least one computer vision technique include, but are not limited to, a photogrammetry technique, a multiview stereo technique, a depth from motion technique.

Optionally, the method further comprises determining an overlapping field of view that is common between fields of view of the respective cameras of the at least two devices, wherein the neural network is trained based on the overlapping field of view. When the fields of view of the respective cameras overlap partially, the overlapping field of view is obtained. The overlapping field of view has an angular width, which is expressed in terms of degrees, radians, or similar. Optionally, the overlapping field of view is determined based on at least one of: the pose information indicative of the poses of the respective cameras of the at least two devices, a search of similar features in the received images captured by the respective cameras of the at least two devices. In this regard, searching the similar features in the received images is performed, by the server, using algorithms such as Oriented FAST and rotated BRIEF (ORB), scale-invariant feature transform (SIFT), speeded up robust features (SURF), and the like. The technical advantage of training the neural network based on the overlapping field of view is that the overlapping field of view includes objects that would be represented in the images captured by the respective cameras of the at least two devices. This allows for better comparison between different images of a same object lying in the overlapping field of view, and this comparison allows for accurately training the neural network. Moreover, training the neural network based on the overlapping field of view, enables the neural network to also be used for other use cases besides generation of correction information.

Optionally, the real-world environment comprises a plurality of sub-regions, wherein the respective cameras of the at least two devices capture images of the plurality of sub-regions at different times. In this way, the at least two devices are present within the same real-world environment, but may be present in same/different sub-regions at different/same times. In such a case, the neural network is trained gradually as and when images of a same sub-region are captured by the respective cameras of the at least two devices and are received by the server. In other words, a dataset required for training the neural network may be obtained by the server in parts, and the step of training the neural network may also be implemented in parts. A given sub-region in the real-world environment may, for example, be a room, a part of the room, an open space, or similar. Optionally, the server is configured to detect that the images of the same sub-region are captured by the respective cameras of the at least two devices by at least one of: processing the images and identifying similarities therein; receiving the depth information from the at least two devices; and identifying at least a partial matching between the respective depth information received from the at least two devices.

Optionally, training of the neural network is discontinued when all the images captured by the respective cameras of the at least two devices are utilised for training, or when the at least two devices are no longer present in the same real-world environment or in the same sub-region of the same real-world environment. Upon such discontinuation, the training of the neural network may be re-started in future when the at least two devices are present again in the same real-world environment or in the same sub-region of the same real-world environment. When re-starting the training of the neural network, the partially-trained neural network (i.e., the neural network whose training was discontinued) is used as input and is trained further.

The trained neural network generates the correction information, which is to be utilised to correct images captured by the camera of the another of the at least two devices. Optionally, the correction information is generated based on the function (indicative of a difference between the ground truth material and the training material) inferred by the neural network during its training. The function is indicative of error(s) in the training material that are required to be corrected, and the correction information is generated based on the function for enabling effective error compensation. The correction of the images includes at least one of: black level correction, defective pixel correction (DPC), Bayer domain denoising, lens shading correction, scaling, automatic white balance gain adjustment, demosaicking, automatic white balance static parameters adjustment, colour conversion matrix interpolation, autofocus, auto exposure, gamma correction, colour space conversion, luma and chroma denoising, sharpening and edge enhancement, contrast adjustment, shot noise correction, chromatic aberration correction, reprojection, drift correction, cropping, resizing, super-resolution, image re-colorization, de-blurring, defocus deblurring, depth field extension, depth information correction, novel view point image synthesis for the camera of the another of the at least two devices based on the images captured by the one of the at least two devices. Some of these corrections are dependent on physical features of lenses and cameras. The correction information is utilised in a way that each image captured by the camera of the another of the at least two devices has a higher quality than images captured by said camera prior to utilising the correction information. Optionally, an Image Signal Processor (ISP) of the camera of the another of the at least two devices and/or a processor of the another of the at least two devices utilises the correction information to correct the images captured by the camera of the another of the at least two devices.

In an embodiment, the correction information comprises correction coefficients that are to be utilised by the server or the another of the at least two devices to correct the images captured by the camera of the another of the at least two devices. The correction coefficients could be utilised to correct at least one of: light scattering errors, illumination errors, colour errors, aberrations, exposure errors, white balance errors, geometric distortion. As an example, correction coefficients that are to be utilized for colour correction in the images may be coefficients of a colour conversion matrix, such coefficients being 2.071, −0.711, −0.360, −0.504, 1.864, −0.361, −0.446, −1.825, 3.272.

In another embodiment, the correction information comprises at least one new neural network that is to be utilised by the server or the another of the at least two devices to correct the images captured by the camera of the another of the at least two devices. The at least one new neural network may replace old, existing neural network(s) being utilised by the server or the another of the at least two devices, may be used in addition to the old, existing neural network(s), or may replace an image signal processor (ISP) or a part of the ISP of the another of the at least two devices. Notably, the at least one new neural network that is to be utilised by the server or the another of the at least two devices is different from the neural network that is used by and trained by the server. The at least one new neural network is particularly used for correcting the images captured by the camera of the another of the at least two devices to eventually obtain high-quality images. Optionally, the at least one new neural network is a CNN or a GAN. Optionally, the at least one new neural network is a cloud-based neural network. Optionally, each of the at least two devices comprises an ISP, wherein a quality of an ISP of the one of the at least two devices is higher than a quality of the ISP of the another of the at least two devices. The ISP, in operation, processes a plurality of image signals that are captured by a plurality of photo-sensitive elements of an image sensor. Furthermore, the ISP may perform image enhancement operations (such as novel view point image synthesis, defocus deblurring, and similar) on captured images or using captured images. As an example, the at least one new neural network may replace an image enhancement part of the ISP of the another of the at least two devices. In such an example, a front-end part of the ISP of the another of the at least two devices could remain unchanged and be implemented at the another of the at least two devices.

In yet another embodiment, the correction information is indicative of at least one of:
  at least one layer of an existing neural network that is to be modified, wherein the existing neural network is being utilised by the server or the another of the at least two devices to process the images captured by the camera of the another of the at least two devices,
  at least one existing neural network whose utilisation is to be discontinued at the server or the another of the at least two devices.

In this regard, when the correction information is indicative of the at least one layer of the existing neural network that is to be modified, the correction information is further indicative of how the at least one layer of the existing neural network is to be modified. In such a case, the at least one layer is modified by at least one of: removal of the at least one layer, changing a number of neurons in the at least one layer, changing weights of neurons in the at least one layer, or similar. The existing neural network with the modified layer(s) is subsequently utilised by the server or the another of the at least two devices to process the images captured by the camera of the another of the at least two devices, wherein these images have higher image quality as compared to the images captured by said camera prior to modification of the at least one layer. When the correction information is indicative of at least one existing neural network whose utilisation is to be discontinued, the at least one existing neural network is not utilized anymore for processing the images captured by the camera of the another of the at least two devices.

In still another embodiment, the correction information is indicative of an image processing technique that is to be utilised by the another of the at least two devices to correct the images captured by the camera of the another of the at least two devices. Such image processing techniques may correct at least one of: sharpness, brightness, hue, saturation, contrast, and the like, in the images. Such image processing techniques are well-known in the art.

Optionally, the camera of the another of the at least two devices has an adjustable focus, wherein the correction information is generated based on a current focal plane of the camera. Notably, the server receives information about the current focal plane from the another of the at least two devices or determines the current focal plane by analysing the images captured by the camera of said device. A focus of the camera of the another of the at least two devices affects generation of the correction information as different corrections may be required to be applied for different focal planes. Upon generation of the correction information and its subsequent utilisation, the camera of the another of the at least two devices having the adjustable focus generates images that have very high visual quality in terms of representing objects lying at the current focal plane, for its entire range of focal planes.

Optionally, the method further comprises detecting a camera type of the respective cameras of the at least two devices, wherein the correction information is generated based on the camera type of the respective cameras. The camera type may be detected by at least one of: image analysis, image metadata, of the images captured by the respective cameras. Examples of the camera type include, but are not limited to, an RGB camera, a monochrome camera, an RGB-D camera, a ranging camera, a LiDAR camera, a flash LiDAR camera, a ToF camera, a SONAR camera, a laser rangefinder, a stereo camera, a plenoptic camera, an infrared camera, a structured-light scanner, an ultrasound imaging equipment, a fixed-focus camera, and an adjustable-focus camera. Optionally, the method further comprises selecting the at least one camera parameter from amongst a plurality of camera parameters, based on the camera type of the respective cameras of the at least two devices.

In some implementations, the server corrects the images captured by the camera of the another of the at least two devices by utilizing the generated correction information. Alternatively, in other implementations, the server sends the generated correction information to the another of the at least two devices for correcting the images captured by the camera at the another of the at least two devices. In such other implementations, the another of the at least two devices, after receiving the correction information, utilises it to correct the images captured by the camera of the another of the at least two devices. As a result of utilising the correction information for correcting said images, an image quality of the images captured by the camera of the another of the at least two devices is higher than an image quality of previous images (i.e., images captured prior to utilisation of the correction information) captured by the camera of the another of the at least two devices. An accuracy of the trained neural network improves over time, as it is repeatedly trained and used, thereby minimising errors and drift of the camera of the camera of the another of the at least two devices over time.

Optionally, the method further comprises:
determining whether an extent of change in the image quality of the camera of the another of the at least two devices upon utilising the correction information is greater than a predefined threshold value; and
when it is determined that the extent of change is greater than the predefined threshold value,
identifying the correction information as a successful correction; and
storing the correction information along with information about the camera type for future reference.

Optionally, in this regard, the extent of change in the image quality is determined by comparing the images captured by the camera of the another of the at least two devices with subsequently-corrected images that have been corrected by utilising the correction information. Such comparison could be performed by employing at least one image analysis. In this regard, it is determined how utilising the correction information has impacted the image quality of the camera of the another of the at least two devices having said camera type. The change in image quality of said camera upon utilising the correction information may be that of an improvement (i.e., an increase) in the image quality when the images have a higher image quality than the images captured previously, and vice versa. In other words, the change in the image quality of said camera is indicative of an extent of success or failure of image correction.

Moreover, it will be appreciated that the predefined threshold value depends on the at least one camera parameter employed to measure the image quality. In this regard, the extent of change in the image quality of said camera (upon utilising the correction information) could be measured by employing at least one of: peak signal-to-noise ratio (PSNR), structured similarity indexing method (SSIM), learned perceptual image patch similarity (LPIPS), feature similarity indexing method (FSIM), mean squared error (MSE), colour mean angular error (MAE), CIEDE2000 colour error. The extent of change in the image quality of said camera could also be measured in terms of megapixels. It will be appreciated that the extent of change in the image quality could be measured using other application-specific metrics. Such application-specific metrics may, for example, be based on the camera type of said camera. Moreover, the change in the image quality of said camera could also depend on latency arising from network delays between the server and the another of the at least two devices, and/or processing time taken in correcting the images (by utilising the correction information). Thus, the predefined threshold value depends on how the extent of change in the image quality is being measured.

Optionally, the correction information and the information about the camera type are stored as historical data at the data repository. Beneficially, in future, when a new camera of the same camera type is found, the historical data of the same camera type is referred to determine what type of corrections have been successful with cameras of the same camera type. In other words, the historical data enables to identify the types of corrections that could be applied to images captured by the new camera.

The present disclosure also relates to the system as described above. Various embodiments and variants disclosed above apply mutatis mutandis to the system.

Optionally, in the system, the server is configured to:
receive, from the at least two devices, pose information indicative of poses of the respective cameras of the at least two devices; and
determine, based on the pose information, a relative position and orientation between the respective cameras of the at least two devices, wherein the neural network is trained based on the relative position and orientation between the respective cameras.

Optionally, in the system, the server is configured to determine an overlapping field of view that is common between fields of view of the respective cameras of the at least two devices, wherein the neural network is trained based on the overlapping field of view.

Optionally, in the system, the correction information comprises correction coefficients that are to be utilised by the server or the another of the at least two devices to correct the images captured by the camera of the another of the at least two devices.

Optionally, in the system, the correction information comprises at least one new neural network that is to be utilised by the server or the another of the at least two devices to correct the images captured by the camera of the another of the at least two devices.

Optionally, in the system, the correction information is indicative of at least one of:
- at least one layer of an existing neural network that is to be modified, wherein the existing neural network is being utilised by the server or the another of the at least two devices to process the images captured by the camera of the another of the at least two devices,
- at least one existing neural network whose utilisation is to be discontinued at the server or the another of the at least two devices.

Optionally, in the system, the images captured by the camera of the one of the at least two devices and the images captured by the camera of the another of the at least two devices are captured simultaneously.

Optionally, in the system, the at least two devices have an overlap of at least a predefined angular width in the fields of view of their respective cameras.

Optionally, in the system, the one of the at least two devices is identified based on historical data of the camera of the one of the at least two devices and the camera of the another of the at least two devices, wherein the historical data pertains to at least one image analysis of images captured previously.

Optionally, in the system, the images are received in a raw image format.

Optionally, in the system, the camera of the another of the at least two devices has an adjustable focus, and wherein the correction information is generated based on a current focal plane of the camera.

Optionally, in the system, the server is configured to detect a camera type of the respective cameras of the at least two devices, wherein the correction information is generated based on the camera type of the respective cameras.

Optionally, the server is further configured to:
- determine whether an extent of change in the image quality of the camera of the another of the at least two devices upon utilising the correction information is greater than a predefined threshold value; and
- when it is determined that the extent of change is greater than the predefined threshold value,
  - identify the correction information as a successful correction; and
  - store the correction information along with information about the camera type for future reference.

DETAILED DESCRIPTION OF THE DRAWINGS

Figure 1:
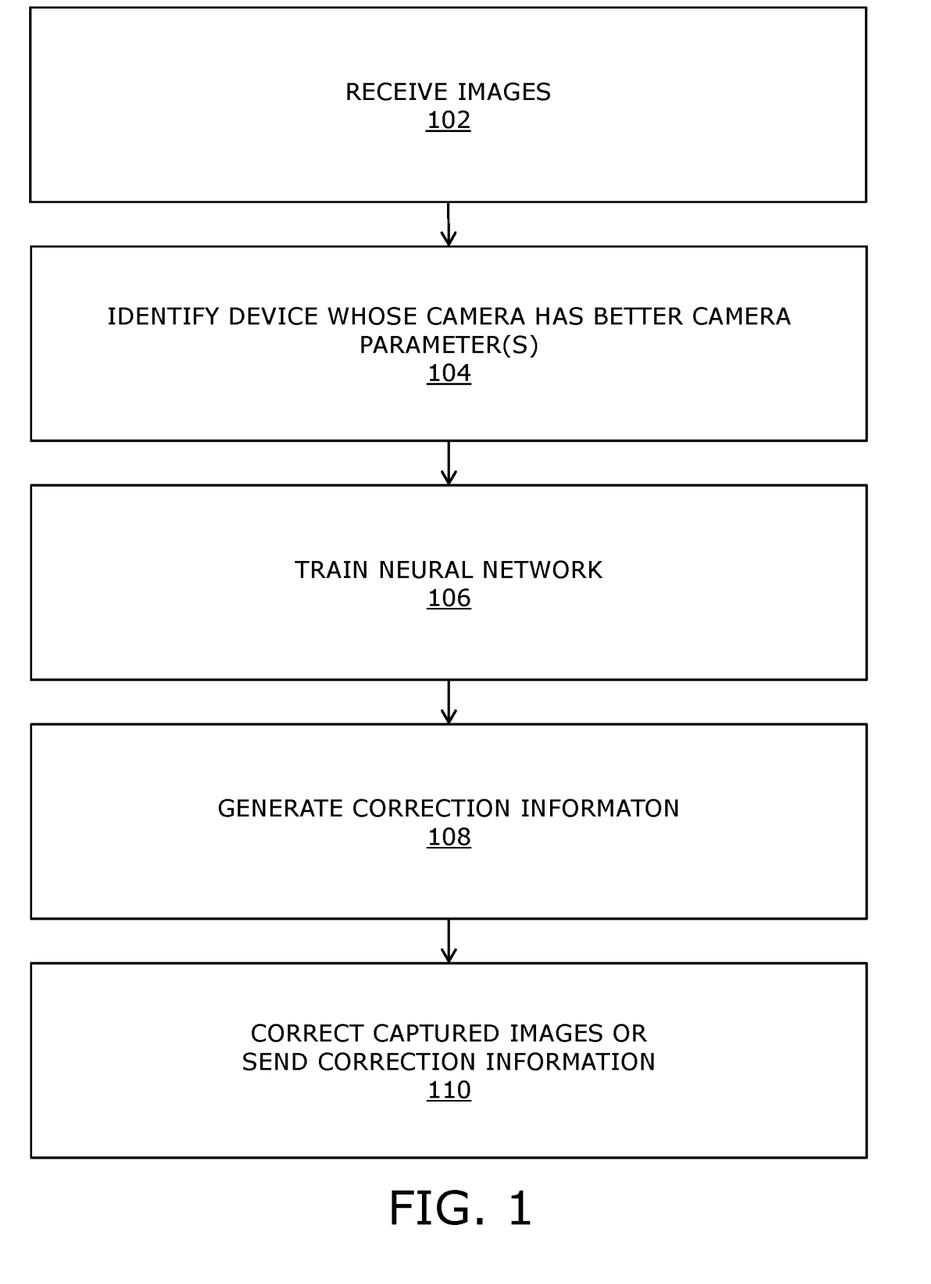
FIG. 1 illustrates a flowchart depicting steps of a method for camera correction, in accordance with an embodiment of the present disclosure.

Referring to FIG. 1, illustrated is a flowchart depicting steps of a method for camera correction, in accordance with an embodiment of the present disclosure. The method is optionally used for implementing cloud-based training. At a step 102, images captured by respective cameras of at least two devices are received from the at least two devices. At a step 104, one of the at least two devices whose camera has at least one camera parameter that is better than at least one camera parameter of a camera of another of the at least two devices is identified. At a step 106, a neural network is trained using images captured by the camera of the one of the at least two devices as ground truth material and using images captured by the camera of the another of the at least two devices as training material. At a step 108, there is generated correction information that is to be utilised to correct images captured by the camera of the another of the at least two devices using the trained neural network. At a step 110, the images captured by the camera of the another of the at least two devices are corrected by utilising the correction information at the server, or the correction information is sent to the another of the at least two devices for correcting the images captured by the camera at the another of the at least two devices.

The aforementioned steps are only illustrative and other alternatives can also be provided where one or more steps are added, one or more steps are removed, or one or more steps are provided in a different sequence without departing from the scope of the claims herein.

Figure 2:
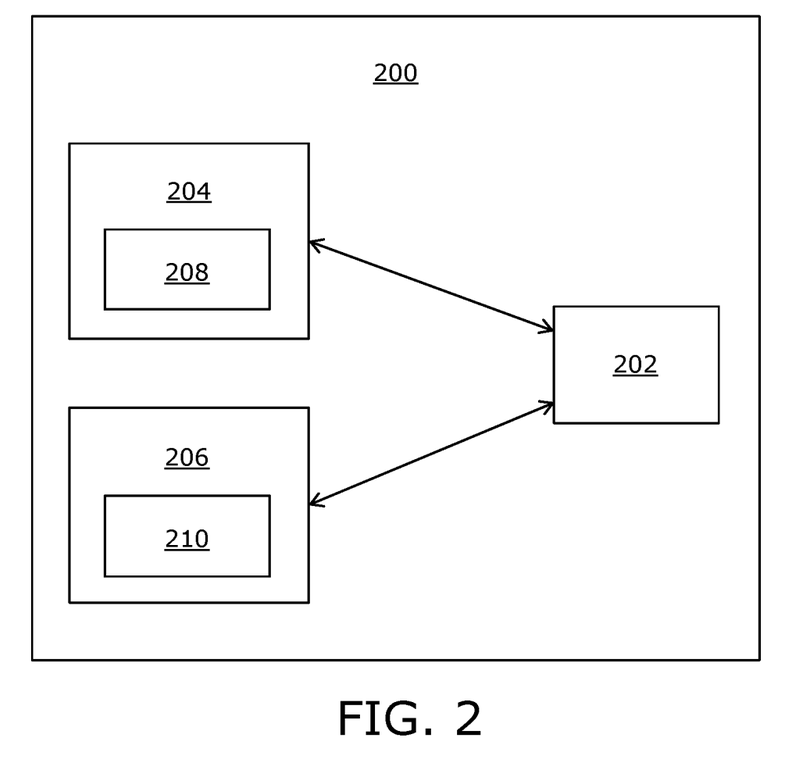
FIG. 2 illustrates a block diagram of a system for camera correction, in accordance with an embodiment of the present disclosure.

Referring to FIG. 2, illustrated is a block diagram of a system 200 for camera correction, in accordance with an embodiment of the present disclosure. The system 200 comprises a server 202 that is communicably coupled to at least two devices (depicted as devices 204 and 206). Each of the devices 204 and 206 comprises at least one camera (depicted as cameras 208 and 210 respectively). For example, the device 206 may be identified as one of the at least two devices whose camera 210 has at least one camera parameter that is better than at least one camera parameter of the camera 208 of another of the at least two devices (which may be identified as the device 204). The system 200 may also comprise a data repository (not shown) communicably coupled to the server 202.

FIG. 2 is merely an example, which should not unduly limit the scope of the claims herein. It is to be understood that the specific implementation of the system 200 is provided as an example and is not to be construed as limiting it to specific numbers, arrangements or types of devices and cameras. A person skilled in the art will recognize many variations, alternatives, and modifications of embodiments of the present disclosure.

Figure 3:
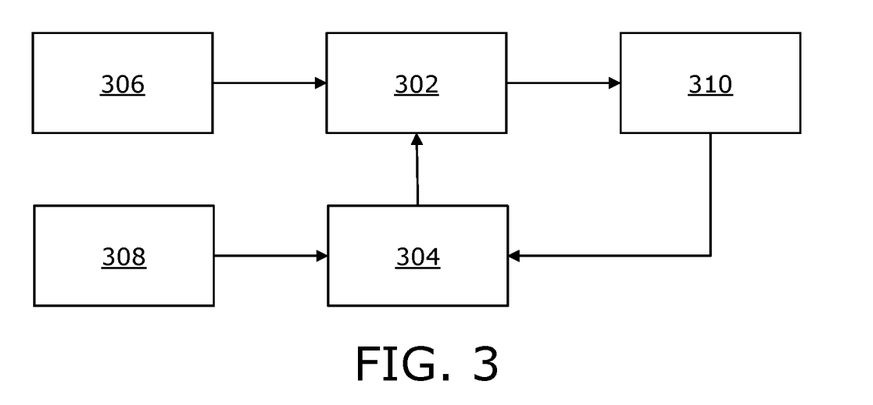
FIG. 3 illustrates an exemplary generative adversarial network (GAN)-based architecture of a neural network employed by a system, in accordance with an embodiment of the present disclosure.

Referring to FIG. 3, illustrated is an exemplary generative adversarial network (GAN)-based architecture of a neural network employed by a system, in accordance with an embodiment of the present disclosure. The neural network includes a generator 302 and a discriminator 304. A low-quality image 306 is provided as input to the generator 302 whereas a high-quality image 308 is provided as input to the discriminator 304. The low-quality image 306 may be captured by a low-quality camera whereas the high-quality image 308 may be captured by a high-quality camera. The generator 302 generates an image 310 that is quality-corrected with respect to the image 306. The discriminator 304 classifies whether the image 310 is actually of a better quality than the image 306 or the image 308, based on a loss function. An output of the discriminator 304 is passed to the generator 302, to learn a desired correction. Such an architecture is suitable for various image reconstruction, restoration and context aware corrections.

Figure 4A:
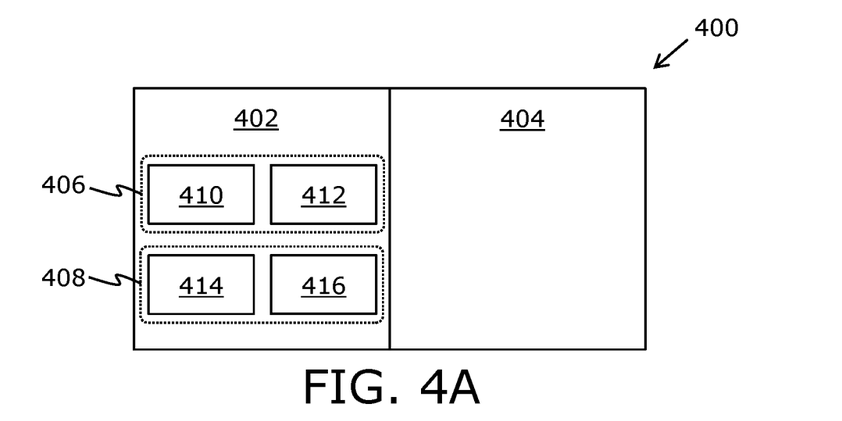
FIGS. 4A, 4B, and 4C illustrate an exemplary scenario according to which a dataset for training a neural network is collected, in accordance with an embodiment of the present disclosure.
Figure 4B:
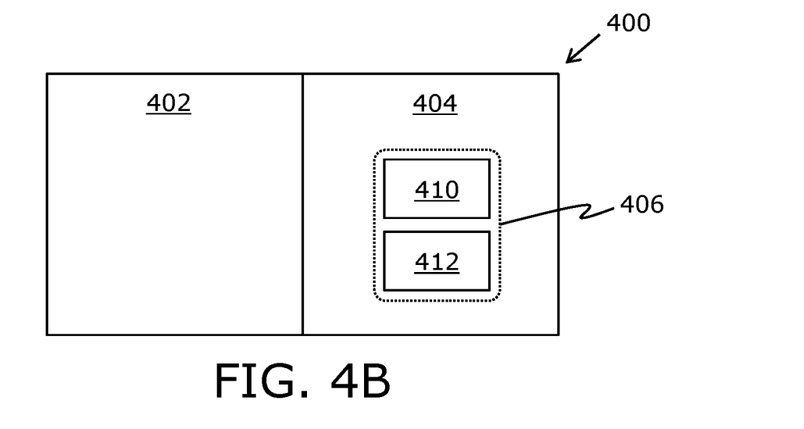
Figure 4C:
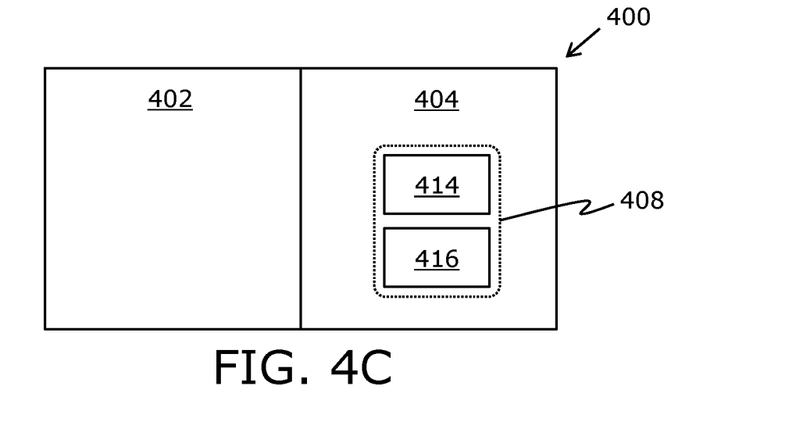

Referring to FIGS. 4A, 4B, and 4C, illustrated is an exemplary scenario according to which a dataset for training a neural network is collected, in accordance with an embodiment of the present disclosure. FIGS. 4A, 4B and 4C represent an exemplary real-world environment 400 comprising a plurality of sub-regions (depicted as sub-regions 402 and 404). There are also shown two devices 406 and 408 that are present in the real-world environment 400, wherein the device 406 comprises a visible-light camera 410 and a depth camera 412, and wherein the device 408 comprises a visible-light camera 414 and a depth camera 416.

In FIG. 4A, the two devices 406 and 408 are shown to be present in the sub-region 402 at time T1. Thus, respective cameras of the two devices 406 and 408 would capture visible-light images and depth images of the sub-region 402 at time T1 and send these images to a server. In FIG. 4B, the device 406 is shown to be present in the sub-region 404 at time T2. Thus, the cameras 410 and 412 of the device 406 would capture visible-light images and depth images of the sub-region 404 at time T2 and send these images to the server. In FIG. 4C, the device 408 is shown to be present in the sub-region 404 at time T3. Thus, the cameras 414 and 416 of the device 408 would capture visible-light images and depth images of the sub-region 404 at time T3 and send these images to the server. In this way, the dataset required for training the neural network is obtained by the server in parts, and the neural network is subsequently trained. According to FIGS. 4A-4C, the dataset is obtained, for example, from time T1 to time T3, which may be a time duration spanning seconds, months, days, weeks, or similar. As an example, the neural network may be trained for defocus deblurring of the images captured by the cameras 410 and 412 when the cameras 414 and 416 provide higher-quality images for training. In such an example, the device 408 would be identified as the one of the at least two devices whose cameras 414 and 416 have at least one camera parameter that is better than at least one camera parameter of cameras 410 and 412 of another of the at least two devices (identified as the device 406). In future, the images captured by the cameras 410 and 412 can be used for training the neural network to perform defocus deblurring of images captured by another camera(s).

Figure 5A:
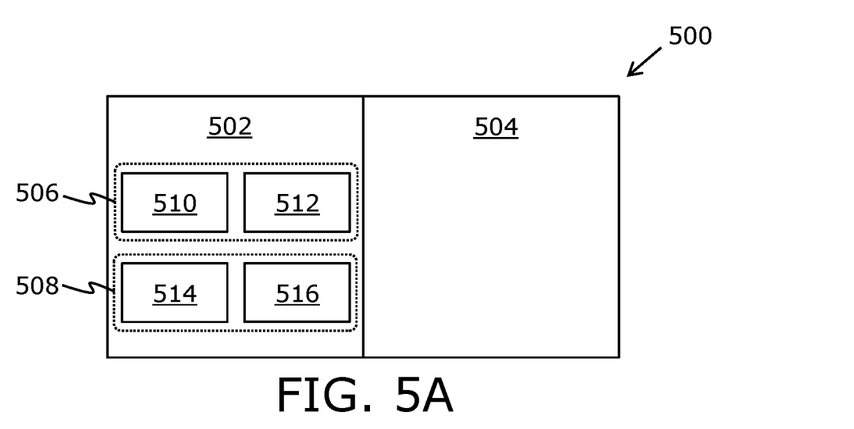
FIGS. 5A, 5B, and 5C illustrate an exemplary scenario according to which a novel view point image synthesis is performed, in accordance with an embodiment of the present disclosure.
Figure 5B:
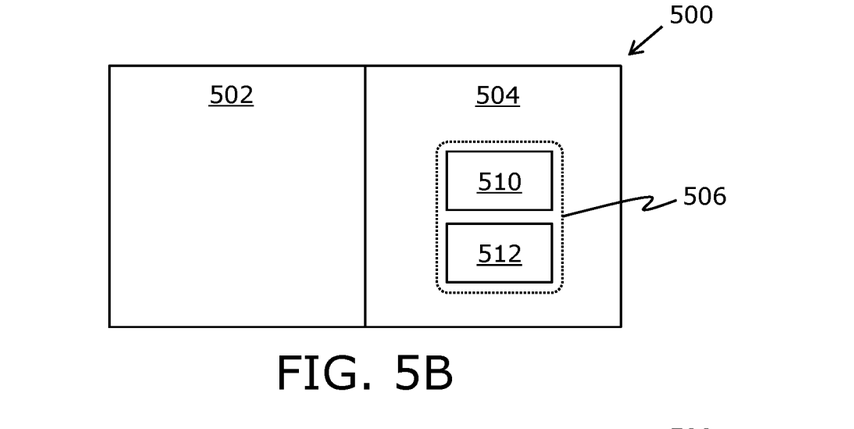
Figure 5C:
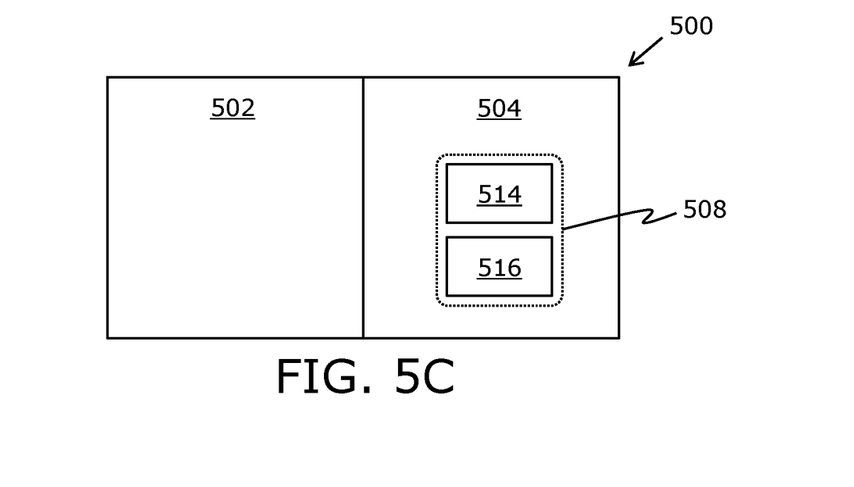

Referring to FIGS. 5A, 5B, and 5C, illustrated is an exemplary scenario according to which novel view point image synthesis is performed, in accordance with an embodiment of the present disclosure. FIGS. 5A, 5B and 5C represent an exemplary real-world environment 500 comprising a plurality of sub-regions (depicted as sub-regions 502 and 504). There are also shown two devices 506 and 508 that are present in the real-world environment 500, wherein the device 506 comprises a visible-light camera 510 and a pose-tracking means 512, and wherein the device 508 comprises a visible-light camera 514 and a pose-tracking means 516. As an example, the device 508 may be identified as one of the at least two devices whose camera 514 has at least one camera parameter that is better than at least one camera parameter of the camera 510 of another of the at least two devices (which may be identified as the device 506).

In FIG. 5A, the two devices 506 and 508 are shown to be present in the sub-region 502 at time T1. Thus, the cameras 510 and 514 of the two devices 506 and 508 would capture visible-light images of the sub-region 502 at time T1 and send these images to a server. The pose-tracking means 512 and 516 of the two devices 506 and 508 track poses of said devices. Pose information indicative of these poses is sent from the two devices 506 and 508 to the server.

In FIG. 5B, the device 506 is shown to be present in the sub-region 504 at time T2. Thus, the camera 510 would capture visible-light images of the sub-region 504 at time T2 and the pose-tracking means 512 tracks a pose of the device 506. These images and pose information indicative of the pose are sent from the device 506 to the server. The neural network is trained using these images and the pose information. Subsequently, given a pose of the device 508, novel view point image synthesis for the device 508 is performed by the neural network.

In FIG. 5C, the device 508 is shown to be present in the sub-region 504 at time T3. Thus, the camera 514 would capture visible-light images of the sub-region 504 at time T3 and the pose-tracking means 516 tracks a pose of the device 508. These images and pose information indicative of the pose are sent from the device 508 to the server. The neural network is trained using these images and the pose information. Subsequently, given a pose of the device 506, novel view point image synthesis for the device 506 is performed by the neural network.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method implemented by a server that is communicably coupled to at least two devices, each of the at least two devices comprising at least one camera, the at least two devices being present within a same real-world environment, the method comprising:
receiving, from the at least two devices, images captured by respective cameras of the at least two devices;
identifying one of the at least two devices whose camera has at least one camera parameter that is better than at least one camera parameter of a camera of another of the at least two devices;
training a neural network using images captured by the camera of the one of the at least two devices as ground truth material and using images captured by the camera of the another of the at least two devices as training material;
generating correction information that is to be utilised to correct images captured by the camera of the another of the at least two devices using the trained neural network, wherein the correction information comprises at least one new neural network that is to be utilised by the server or the another of the at least two devices to correct the images captured by the camera of the another of the at least two devices; and
correcting the images captured by the camera of the another of the at least two devices by utilising the correction information at the server, or sending the correction information to the another of the at least two devices for correcting the images captured by the camera at the another of the at least two devices.

2. The method of claim 1, further comprising:
receiving, from the at least two devices, pose information indicative of poses of the respective cameras of the at least two devices; and
determining, based on the pose information, a relative position and orientation between the respective cameras of the at least two devices,
wherein the neural network is trained based on the relative position and orientation between the respective cameras.

3. The method of claim 1, further comprising determining an overlapping field of view that is common between fields of view of the respective cameras of the at least two devices, wherein the neural network is trained based on the overlapping field of view.

4. The method of claim 1, wherein the correction information comprises correction coefficients that are to be utilised by the server or the another of the at least two devices to correct the images captured by the camera of the another of the at least two devices.

5. The method of claim 1, wherein the correction information is indicative of at least one of:
- at least one layer of an existing neural network that is to be modified, wherein the existing neural network is being utilised by the server or the another of the at least two devices to process the images captured by the camera of the another of the at least two devices,
- at least one existing neural network whose utilisation is to be discontinued at the server or the another of the at least two devices.

6. The method of claim 1, wherein the images captured by the camera of the one of the at least two devices and the images captured by the camera of the another of the at least two devices are captured simultaneously.

7. The method of claim 1, wherein the at least two devices have an overlap of at least a predefined angular width in the fields of view of their respective cameras.

8. The method of claim 1, wherein the step of identifying the one of the at least two devices is performed based on historical data of the camera of the one of the at least two devices and the camera of the another of the at least two devices, wherein the historical data pertains to at least one image analysis of images captured previously.

9. The method of claim 1, wherein the images are received in a raw image format.

10. The method of claim 1, wherein the camera of the another of the at least two devices has an adjustable focus, wherein the correction information is generated based on a current focal plane of the camera.

11. The method of claim 1, further comprising detecting a camera type of the respective cameras of the at least two devices, wherein the correction information is generated based on the camera type of the respective cameras.

12. The method of claim 1, further comprising:
- determining whether an extent of change in the image quality of the camera of the another of the at least two devices upon utilising the correction information is greater than a predefined threshold value; and
- when it is determined that the extent of change is greater than the predefined threshold value,
  - identifying the correction information as a successful correction; and
  - storing the correction information along with information about the camera type for future reference.

13. A system comprising a server that is communicably coupled to at least two devices, each of the at least two devices comprising at least one camera, the at least two devices being present within a same real-world environment, wherein the server is configured to:
- receive, from the at least two devices, images captured by respective cameras of the at least two devices;
- identify one of the at least two devices whose camera has at least one camera parameter that is better than at least one camera parameter of a camera of another of the at least two devices;
- train a neural network using images captured by the camera of the one of the at least two devices as ground truth material and using images captured by the camera of the another of the at least two devices as training material;
- generate correction information that is to be utilised to correct images captured by the camera of the another of the at least two devices using the trained neural network, wherein the correction information comprises at least one new neural network that is to be utilised by the server or the another of the at least two devices to correct the images captured by the camera of the another of the at least two devices; and
- correct the images captured by the camera of the another of the at least two devices by utilising the correction information at the server, or send the correction information to the another of the at least two devices for correcting the images captured by the camera at the another of the at least two devices.

14. The system of claim 13, wherein the server is configured to:
- receive, from the at least two devices, pose information indicative of poses of the respective cameras of the at least two devices; and
- determine, based on the pose information, a relative position and orientation between the respective cameras of the at least two devices,
- wherein the neural network is trained based on the relative position and orientation between the respective cameras.

15. The system of claim 13, wherein the server is configured to determine an overlapping field of view that is common between fields of view of the respective cameras of the at least two devices, wherein the neural network is trained based on the overlapping field of view.

16. The system of claim 13 wherein the correction information comprises correction coefficients that are to be utilised by the server or the another of the at least two devices to correct the images captured by the camera of the another of the at least two devices.

17. The system of claim 13, wherein the correction information is indicative of at least one of:
- at least one layer of an existing neural network that is to be modified, wherein the existing neural network is being utilised by the server or the another of the at least two devices to process the images captured by the camera of the another of the at least two devices,
- at least one existing neural network whose utilisation is to be discontinued at the server or the another of the at least two devices.

18. The system of claim 13, wherein the images captured by the camera of the one of the at least two devices and the images captured by the camera of the another of the at least two devices are captured simultaneously.

19. The system of claim 13, wherein the at least two devices have an overlap of at least a predefined angular width in the fields of view of their respective cameras.

20. The system of claim 13, wherein the one of the at least two devices is identified based on historical data of the camera of the one of the at least two devices and the camera of the another of the at least two devices, wherein the historical data pertains to at least one image analysis of images captured previously.

21. The system of claim 13, wherein the images are received in a raw image format.

22. The system of claim 13, wherein the camera of the another of the at least two devices has an adjustable focus, and wherein the correction information is generated based on a current focal plane of the camera.

23. The system of claim 13, wherein the server is configured to detect a camera type of the respective cameras of the at least two devices, wherein the correction information is generated based on the camera type of the respective cameras.

24. The system of claim 13, wherein the server is further configured to:
- determine whether an extent of change in the image quality of the camera of the another of the at least two devices upon utilising the correction information is greater than a predefined threshold value; and when it is determined that the extent of change is greater than the predefined threshold value, identify the correction information as a successful correction; and store the correction information along with information about the camera type for future reference.

25. A method implemented by a server that is communicably coupled to at least two devices, each of the at least two devices comprising at least one camera, the at least two devices being present within a same real-world environment, the method comprising:

receiving, from the at least two devices, images captured by respective cameras of the at least two devices;

identifying one of the at least two devices whose camera has at least one camera parameter that is better than at least one camera parameter of a camera of another of the at least two devices;

training a neural network using images captured by the camera of the one of the at least two devices as ground truth material and using images captured by the camera of the another of the at least two devices as training material;

generating correction information that is to be utilised to correct images captured by the camera of the another of the at least two devices using the trained neural network, wherein the correction information is indicative of at least one of:

at least one layer of an existing neural network that is to be modified, wherein the existing neural network is being utilised by the server or the another of the at least two devices to process the images captured by the camera of the another of the at least two devices, and at least one existing neural network whose utilisation is to be discontinued at the server or the another of the at least two devices, and correcting the images captured by the camera of the another of the at least two devices by utilising the correction information at the server, or sending the correction information to the another of the at least two devices for correcting the images captured by the camera at the another of the at least two devices.

26. The method of claim 25, further comprising:

receiving, from the at least two devices, pose information indicative of poses of the respective cameras of the at least two devices; and determining, based on the pose information, a relative position and orientation between the respective cameras of the at least two devices, wherein the neural network is trained based on the relative position and orientation between the respective cameras.

27. A system comprising a server that is communicably coupled to at least two devices, each of the at least two devices comprising at least one camera, the at least two devices being present within a same real-world environment, wherein the server is configured to:

receive, from the at least two devices, images captured by respective cameras of the at least two devices;

identify one of the at least two devices whose camera has at least one camera parameter that is better than at least one camera parameter of a camera of another of the at least two devices;

train a neural network using images captured by the camera of the one of the at least two devices as ground truth material and using images captured by the camera of the another of the at least two devices as training material;

generate correction information that is to be utilised to correct images captured by the camera of the another of the at least two devices using the trained neural network, wherein the correction information is indicative of at least one of:

at least one layer of an existing neural network that is to be modified, wherein the existing neural network is being utilised by the server or the another of the at least two devices to process the images captured by the camera of the another of the at least two devices, and at least one existing neural network whose utilisation is to be discontinued at the server or the another of the at least two devices; and correct the images captured by the camera of the another of the at least two devices by utilising the correction information at the server, or send the correction information to the another of the at least two devices for correcting the images captured by the camera at the another of the at least two devices.

28. The system of claim 27, wherein the server is configured to:

receive, from the at least two devices, pose information indicative of poses of the respective cameras of the at least two devices; and determine, based on the pose information, a relative position and orientation between the respective cameras of the at least two devices, wherein the neural network is trained based on the relative position and orientation between the respective cameras.

* * * * *